US009379513B2

(12) United States Patent
Atlas et al.

(10) Patent No.: US 9,379,513 B2
(45) Date of Patent: Jun. 28, 2016

(54) METHOD FOR CONTROLLING SIGNAL GAIN OF A RAMAN AMPLIFIER (71) Applicant: ADVA Optical Networking SE, Meiningen OT Dreißigacker (DE)

(72) Inventors: Dogan Atlas, Johns Creek, GA (US); Mohammad Taleghani, Roswell, GA (US); Mohammad Mahbobzadeh, Suwanee, GA (US); Kyle Hamilton, Norcross, GA (US)

(73) Assignee: ADVA Optical Networking SE, Meiningen ot Dreissigacker (DE)

( * ) Notice: Subject to any disclaimer, the term of this patent is extended or adjusted under 35 U.S.C. 154(b) by 0 days.

(21) Appl. No.: 14/299,418

(22) Filed: Jun. 9, 2014

(65) Prior Publication Data

US 2014/0285874 A1    Sep. 25, 2014

Related U.S. Application Data (63) Continuation of application No. 13/419,422, filed on Mar. 13, 2012, now Pat. No. 8,854,726.

(51) Int. Cl.
| H01S 3/13 | (2006.01) |
| H01S 3/067 | (2006.01) |
| H04B 10/29 | (2013.01) |
| H04B 10/071 | (2013.01) |
| H01S 3/094 | (2006.01) |
| H01S 3/10 | (2006.01) |
| H01S 3/30 | (2006.01) |
| H04B 10/291 | (2013.01) |
| H04B 10/293 | (2013.01) |
| H01S 3/0941 | (2006.01) |

(52) U.S. Cl.
CPC ........... *H01S 3/1302* (2013.01); *H01S 3/06754* (2013.01); *H01S 3/094046* (2013.01); *H01S 3/10015* (2013.01); *H01S 3/1301* (2013.01); *H01S 3/1305* (2013.01); *H01S 3/30* (2013.01); *H01S 3/302* (2013.01); *H04B 10/071* (2013.01); *H04B 10/2916* (2013.01); *H04B 10/2931* (2013.01); *H01S 3/09415* (2013.01); *H01S 3/10069* (2013.01)

(58) Field of Classification Search
CPC ............. H04B 10/293; H04B 10/2931; H04B 10/071; H04B 10/077; H04B 10/2537; H01S 3/06754; H01S 3/1086
See application file for complete search history.

(56) References Cited

U.S. PATENT DOCUMENTS

| 6,433,922 B1 * | 8/2002 | Ghera ................ H04B 10/2916 359/334 |
| 6,724,524 B1 * | 4/2004 | Evans ..................... H01S 3/302 359/334 |
| 6,850,360 B1 | 2/2005 | Chen et al. |

(Continued)

FOREIGN PATENT DOCUMENTS

| EP | 1 298 764 A2 | 4/2003 |
| EP | 1 916 565 A1 | 4/2008 |

(Continued)

*Primary Examiner* — Eric Bolda
(74) *Attorney, Agent, or Firm* — Norton Rose Fulbright US LLP (57) ABSTRACT

A Raman amplifier comprising a gain control unit adapted to control a pump power of an optical pump signal in response to at least one monitored optical feedback signal reflected back from a transmission line fiber connected to said pumped Raman amplifier.

10 Claims, 3 Drawing Sheets

(56) References Cited

U.S. PATENT DOCUMENTS

| | | |
|---|---|---|
| 7,206,123 B2 | 4/2007 | Emori et al. |
| 2001/0040719 A1 | 11/2001 | Okuno et al. |
| 2002/0024721 A1 | 2/2002 | Tsuzaki et al. |
| 2002/0041431 A1* | 4/2002 | Ohshima et al. ............... 359/334 |
| 2002/0118442 A1 | 8/2002 | Ghera et al. |
| 2003/0011855 A1 | 1/2003 | Fujiwara |
| 2003/0117692 A1* | 6/2003 | Tanaka et al. ................. 359/334 |
| 2004/0032642 A1* | 2/2004 | Imai et al. ..................... 359/334 |
| 2004/0052453 A1 | 3/2004 | Mao et al. |
| 2004/0075887 A1 | 4/2004 | Eiselt |
| 2004/0246566 A1 | 12/2004 | Miyamoto et al. |
| 2005/0024712 A1 | 2/2005 | Hiraizumi et al. |
| 2006/0187539 A1 | 8/2006 | Zhou et al. |
| 2007/0103766 A1 | 5/2007 | frriedrich |
| 2007/0258132 A1 | 11/2007 | Zhou et al. |
| 2009/0153951 A1 | 6/2009 | Hiraizumi et al. |

FOREIGN PATENT DOCUMENTS

| | | |
|---|---|---|
| JP | 2001235772 A | 8/2001 |
| JP | 2003298527 A | 10/2003 |
| WO | WO 02/17520 A1 | 2/2002 |

* cited by examiner

METHOD FOR CONTROLLING SIGNAL GAIN OF A RAMAN AMPLIFIER

CROSS-REFERENCE TO RELATED APPLICATIONS

This application is a continuation of U.S. patent application Ser. No. 13/419,422, filed on Mar. 13, 2012, the disclosure of which is incorporated by reference herein.

TECHNICAL BACKGROUND

A Raman amplifier is a type of optical amplifier used in fiber optic transmission systems. Raman amplification is based on the Stimulated Raman Scattering (SRS) phenomenon where a lower frequency signal photon induces a scattering of a higher frequency pump photon in an optical medium in the nonlinear regime. As a result of this, another signal photon is produced, wherein the surplus energy resonantly passes through the vibrational states of the medium. Raman amplifiers are being deployed in long-haul, regional, and metro-core fiber optic transmission systems. Distributed Raman amplifiers improve the optical signal-to-noise ratio and reduce the nonlinear penalty of fiber systems, allowing for longer reach, longer amplifier spans, higher bit rates, higher number of channels, closer channel spacing and operation near the fiber zero dispersion wavelength. Raman scattering of incoming light with phonons in the lattice of the gain medium produces photons coherent with the incoming photons. In a Raman amplifier the optical signal is amplified by Raman amplification. Unlike the erbium-doped fiber amplifiers (EDFA) or the semiconductor optical amplifiers (SOA) the amplification effect of a Raman amplifier is achieved by a non-linear interaction between a signal and a pump laser within an optical fiber. Two different types of Raman amplifiers are known, i.e. a distributed and a lumped amplifier. The distributed Raman amplifier is a Raman amplifier in which the transmission line optical fiber is utilized as the gain medium by multiplexing a pump wavelength with a signal wavelength whereas a lumped Raman amplifier utilizes a dedicated, self-contained shorter length of optical fiber to provide amplification. In the case of a lumped Raman amplifier a highly nonlinear fiber with a small core such as dispersion compensating fiber is utilized to increase the interaction between the signal and the pump wavelength. The pump light may be coupled into the transmission fiber in the same direction as the signal (co-directional pumping), in the opposite direction (counter-directional pumping) or in both directions (bi-directional pumping).

In a conventional optical transmission system large signal variations may occur when data channels are added or are dropped within the network. This can lead to sudden and large signal power variations at the input of the transmission line fiber connected to the Raman amplifier which in turn causes a change in signal gain of the amplified surviving data channels along the transmission line fiber. Accordingly, there is a need for a fast dynamic signal gain control of co- or counter-pumped distributed Raman amplifiers.

SUMMARY OF THE INVENTION

The invention provides a method for controlling signal gain of a pumped Raman amplifier, wherein a pump power of a pump signal of said Raman amplifier is controlled in response to at least one monitored optical feedback signal reflected back, due to Rayleigh scattering, from a transmission line fiber connected to said Raman amplifier.

In a possible embodiment of the method according to the present invention the pump power of said optical pump signal is further controlled in response to at least one monitored optical feed-forward signal. In a co-pumped Raman amplifier the feed-forward signal is the transmitted signal launched into said transmission line fiber and in a counter-pumped Raman amplifier the feed-forward signal is the received signal detected from said transmission line fiber.

In a still further possible embodiment of the method according to the present invention the monitored optical signal comprises at least one optical pilot signal transmitted on an optical supervisory channel and/or an optical data signal transmitted on an optical signal channel.

In a further possible embodiment of the method according to the present invention the at least one monitored optical signal is tapped by means of an optical splitter and converted into a feedback control signal and a feed-forward control signal applied to a pump source unit generating said optical pump signal with the controlled pump power launched into said transmission line fiber connected to said Raman amplifier.

In a further possible embodiment of the method according to the present invention the tapped monitored optical signal is converted by a photodetector into an electrical current which is transformed by means of a transimpedance amplifier into a control voltage indicating the signal power of the respective monitored optical signal.

In a further possible embodiment of the method according to the present invention a control voltage corresponding to a ratio between the signal power of the monitored optical feedback signal and the signal power of the monitored optical feed-forward signal is supplied to at least one proportional, integral and differential (PID) control circuit which compares the control voltage with a set voltage read from a look-up table in response to a desired Raman gain set by a user to generate a feedback control signal which controls said pump source unit generating said optical pump signal.

In a further possible embodiment of the method according to the present invention the optical supervisory channel comprises a wavelength band between a pump wavelength band of said optical pump signal and a data signal wavelength band of said optical data signal.

The invention further provides a pumped Raman amplifier comprising a gain control circuit adapted to control a pump power of an optical pump signal in response to at least one monitored optical feedback signal reflected back from a transmission line fiber connected to said pumped Raman amplifier.

In a possible embodiment of the method according to the present invention the gain control circuit is further adapted to control the pump power of said optical pump signal in response to at least one monitored optical feed-forward signal launched into said transmission line fiber connected to said pumped Raman amplifier.

In a further possible embodiment of the method according to the present invention the gain control circuit comprises a PID control circuit which compares a control voltage indicating a ratio between the signal power of the monitored optical feedback signal and the signal power of the monitored optical feed-forward signal with a set voltage read from a look-up table in response to a desired Raman gain set by a user to generate a feedback control signal which controls a pump source unit of said Raman amplifier generating the optical pump signal with the controlled pump power.

In a further possible embodiment of the method according to the present invention the gain control circuit comprises a PID control circuit which compares a control voltage indicating the signal power of the monitored optical feedback signal with a set voltage read from a look-up table in response to a desired Raman gain set by a user to generate a feedback control signal which controls a pump source unit of said Raman amplifier generating the optical pump signal with the controlled pump power.

One can choose to use either the ratio or the absolute back reflection. For example, in a co-pumped Raman amplifier if a data or supervisory signal monitor unit is used for feedback control voltage then one can use a ratio of the power mentioned i.e., $V_{RBS}$. In a co- or counter-pumped Raman amplifier If one uses the pump signal monitor unit the absolute back reflection for feedback control voltage i.e., $V_{BR}$ can be used. For feed-forward control the data signal voltage $V_s$ is used.

In a further possible embodiment of the pumped Raman amplifier according to the present invention the pumped Raman amplifier further comprises:
a first monitoring unit adapted to monitor at least one optical pilot signal transmitted in an optical supervisory channel.

In a further possible embodiment of the pumped Raman amplifier according to the present invention the pumped Raman amplifier further comprises a second monitoring unit adapted to monitor an optical data signal transmitted on an optical data channel.

In a still further possible embodiment of the pumped Raman amplifier according to the present invention the pumped Raman amplifier further comprises a third monitoring unit adapted to monitor an optical pump signal generated by said pump source unit being controlled by said gain control circuit.

In a further possible embodiment of the pumped Raman amplifier according to the present invention each monitoring unit is connected to
an optical splitter adapted to tap the respective monitored optical signal,
at least one photodetector adapted to convert the tapped optical signal into an electrical current, wherein said monitoring unit comprises
at least one transimpedance amplifier adapted to transform said electrical current into a control voltage indicating a signal power of the monitored optical signal.

In a further possible embodiment of the pumped Raman amplifier according to the present invention the gain control circuit comprises feedback gain adjustment means to adjust the feedback control signal provided by the PID control circuit and feed-forward gain adjustment means to adjust a feed-forward control signal provided by a monitoring unit of said pumped Raman amplifier.

In a still further possible embodiment of the pumped Raman amplifier according to the present invention the gain control circuit further comprises at least one signal adder adapted to add the adjusted feedback control signal and the adjusted feed-forward control signal to generate a signal supplied to a driver amplifier of said pump source unit, wherein said driver amplifier is adapted to amplify the signal and to supply the amplified signal to a laser diode of said pump source unit.

The invention further provides a gain control unit for a pumped Raman amplifier, wherein said gain control circuit is adapted to control a pump power of an optical pump signal in response to at least one monitored optical feedback signal reflected back from a transmission line fiber connected to said pumped Raman amplifier.

In a possible embodiment of the gain control unit according to the present invention the gain control circuit is further adapted to control the pump power of the optical pump signal in response to at least one monitored optical feed-forward signal launched into said transmission line fiber connected to said pumped Raman amplifier.

BRIEF DESCRIPTION OF THE FIGURES

In the following possible embodiments of the method and apparatus for controlling a signal gain of a pumped Raman amplifier are described with reference to the enclosed figures.

DETAILED DESCRIPTION OF EMBODIMENTS

Figure 1A:
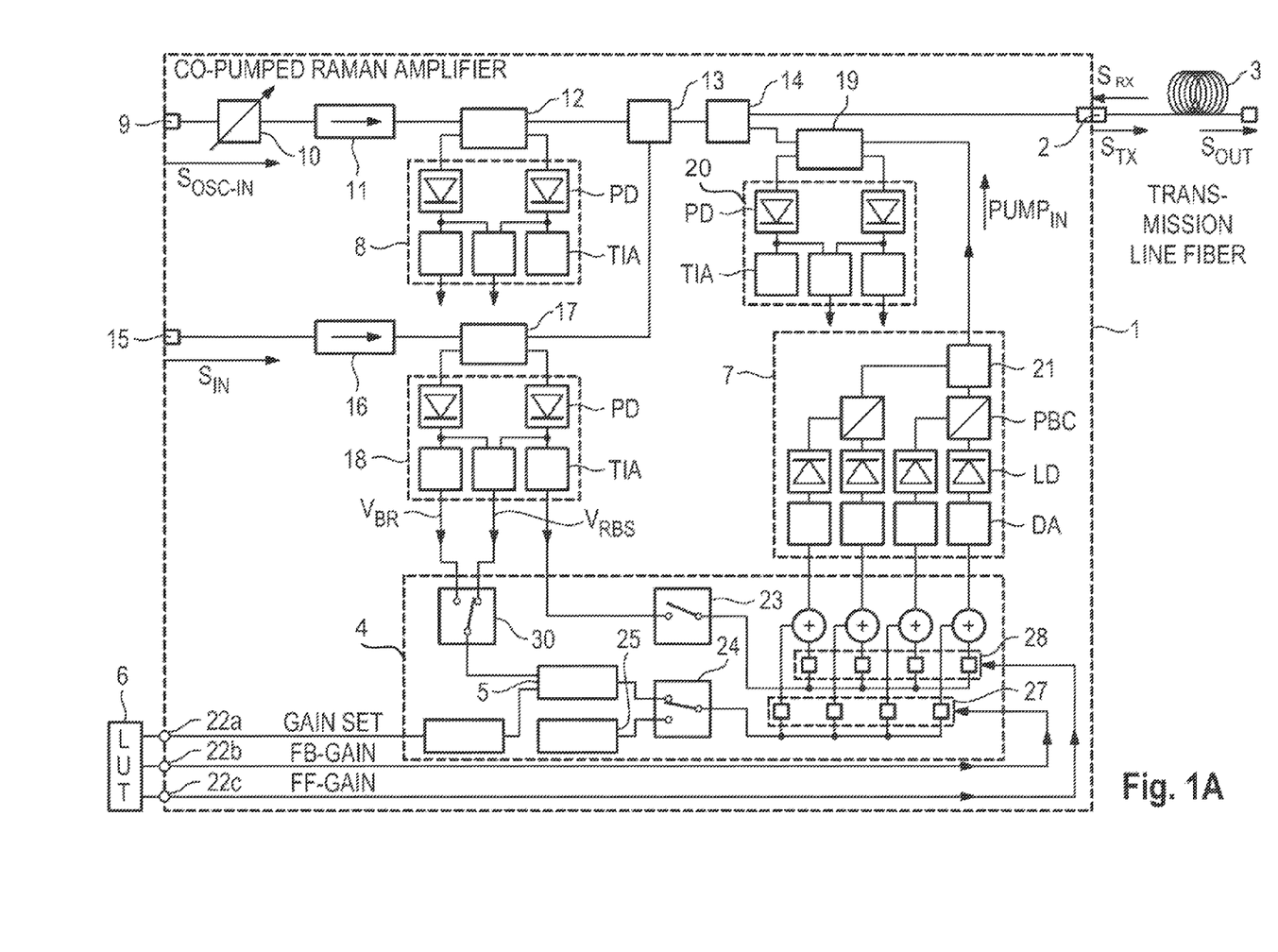
FIGS. 1A, 1B show block diagrams of possible implementations of a pumped Raman amplifier employing the method according to the present invention.
Figure 1B:
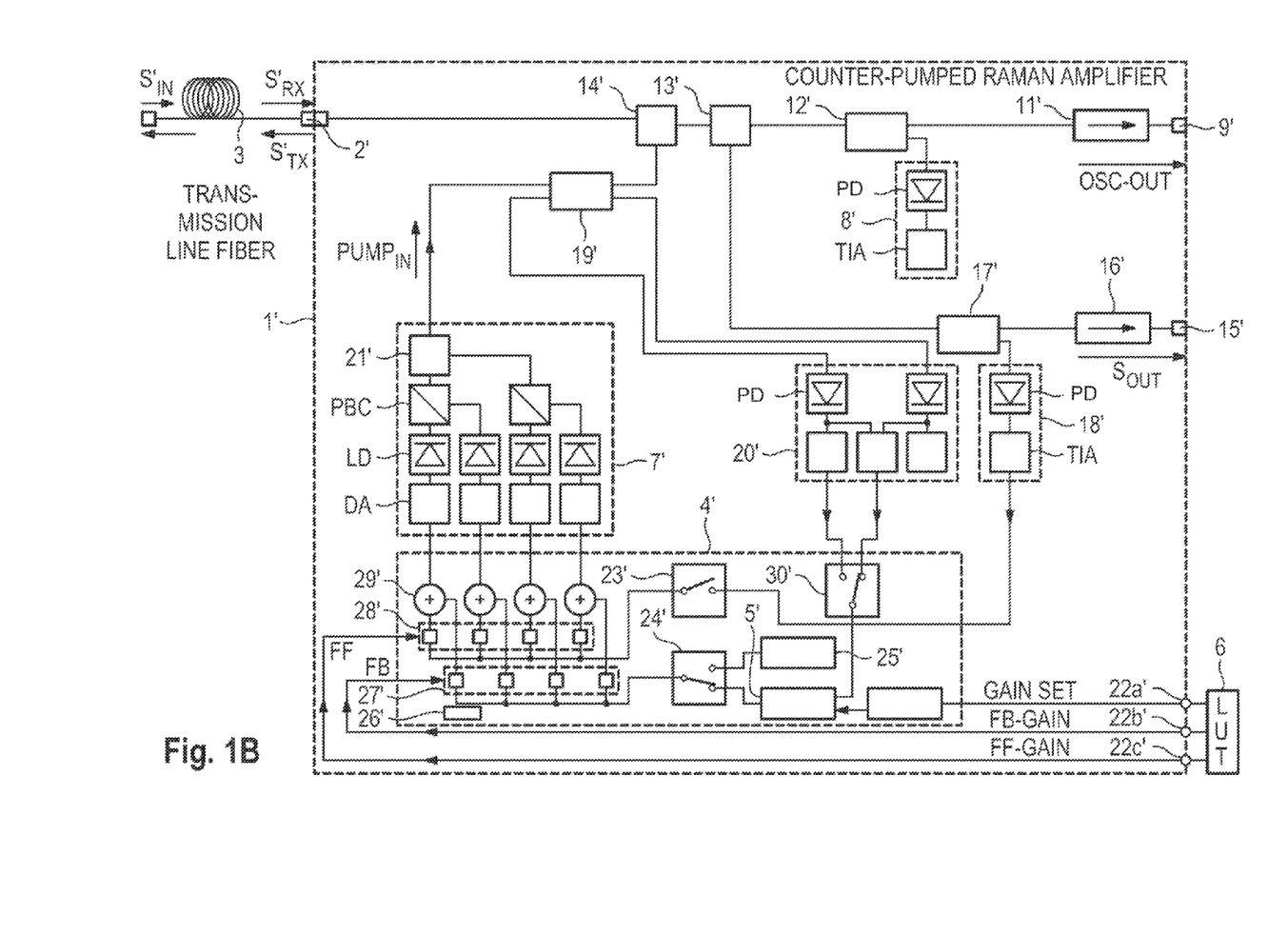

FIG. 1A shows a possible implementation of a pumped Raman amplifier 1 according to the present invention, wherein the pumped Raman amplifier 1 is formed by a co-pumped Raman amplifier connected via its signal output 2 to a transmission line fiber 3 as illustrated in FIG. 1A. FIG. 1B shows a further possible implementation of the pumped Raman amplifier, wherein the pumped Raman amplifier is formed by a counter-pumped Raman amplifier 1'. As can be seen both Raman amplifiers 1, 1' shown in FIGS. 1A, 1B are symmetrical in their circuit structure. The pumped Raman amplifier 1 comprises a gain control unit 4 adapted to control a pump power of an optical pump signal in response to at least one monitored optical feedback signal reflected back from the transmission line fiber 3 connected to the pumped Raman amplifier 1. The gain control unit 4 is further adapted to control the pump power of the optical pump signal in response to at least to one monitored optical feed-forward signal launched into said transmission line fiber 3 connected to the pumped Raman amplifier 1. As can be seen in FIG. 1A the gain control unit 4 comprises in the shown implementation a PID control circuit 5 which compares a control voltage $V_{RBS}$ or $V_{BR}$ applied through a switching unit 30. The control voltage $V_{BR}$ indicates the optical signal power of the monitored optical feedback signal and the control voltage $V_{RBS}$ indicates a ratio between the optical signal power of the monitored optical feedback signal and the optical signal power of the monitored optical forward signal. The control voltage is compared with a set voltage Vset read from a look-up table 6 in response to a desired Raman gain set by a user to generate a feedback (FB) control signal which controls a pump source unit 7 of said Raman amplifier 1 generating the optical pump signal with the controlled pump power. The control voltage $V_{RBS}$ can be generated by the ratio of the optical power of the monitored optical feedback signal which can be the pump signal, a data signal or supervisory signal and the optical power of the monitored optical forward signal which can be also a pump signal, data signal or supervisory signal, respectively. The control voltage $V_{BR}$ can be generated by the optical power of the monitored optical feedback signal which can be the pump signal, data signal or pilot/supervisory signal.

The look up table (LUT) 6 can be stored in a data storage which forms part of the Raman amplifier 1 or to which the Raman amplifier 1 has access via a data network.

As can be seen from FIG. 1A the pumped Raman amplifier 1 comprises in the shown implementation several monitoring units.

A first monitoring unit 8 is adapted to monitor at least one optical pilot signal transmitted in an optical supervisory channel OSC. The pumped Raman amplifier 1 receives the optical pilot signal $S_{OSC-IN}$ at an input 9. The input 9 of the pumped Raman amplifier 1 can, for example, be connected to a transceiver of a central office within in the optical telecommunication system. The received optical pilot signal passes through a variable optical attenuator VOA 10, an optional optical isolator 11 and an optical two-by-two splitter 12 as shown in FIG. 1. The optical splitter 12 is connected to the first monitoring unit 8. The optical splitter 12 is adapted to tap the monitored optical pilot signal transmitted in the optical supervisory channel OSC. The optical splitter 12 is connected to an OSC signal WDM multiplexer 13 which can be formed by an optical filter wherein the multiplexer 13 is adapted to combine the optical pilot signal with a communication signal which can comprise, for example, 1-96 different wavelengths λ. The OSC signal WDM multiplexer 13, is connected to a signal pump WDM multiplexer 14 which in turn is connected to the signal output 2 of the co-pumped Raman amplifier 1 as illustrated in FIG. 1A. At the signal output 2 pump signal, the data signal and the OSC supervisory signal are output and transmitted via the transmission line fiber 3 as transmission signals $S_{TX}$. At the output 2, the backscattered pump signal, data signal, supervisory signal and backward propagating ASE noise are received from the transmission line fiber 3 as received signals $S_{RX}$.

The pumped Raman amplifier 1 has further a signal input 15 for receiving an optical data signal $S_{in}$ transmitted on an optical data channel. This optical data signal is supplied via an optical isolator 16 to a further optical splitter 17 shown in FIG. 1A. The optical splitter 17 can be a two-by-two optical splitter adapted to tap the respective monitored optical signal. The optical splitter 17 is connected to the O3O signal WDM multiplexer 13. The OSC signal WDM multiplexer 13 multiplexes the optical data signal transmitted on one or several optical data channels with the at least one optical pilot signal transmitted on the optical supervisory channel OSC. The second optical splitter 17 is connected to a second signal monitoring unit 18 which is adapted to monitor the optical data signals transmitted on the optical data channels. The optical splitter 17 taps the respective monitored optical signal and supplies the tapped monitored optical data signal to the signal monitoring unit 18.

The signal pump WDM multiplexer 14 is adapted to multiplex the output signal of the OSC signal WDM multiplexer 13 with the pump signal supplied to the signal pump WDM 14 via a third optical splitter 19 from a pump source unit 7. The third optical splitter 19 can be formed by a two-by-two optical splitter as shown in FIG. 1A. The optical splitter 19 is connected to a third monitoring unit 20 adapted to monitor an optical pump signal generated by the pump source unit 7. The pump source unit 7 is controlled by the gain control unit 4 as shown in FIG. 1A. Accordingly, in the embodiment of FIG. 1 the pumped Raman amplifier 1A comprises a first monitoring unit 8 adapted to monitor at least one optical pilot signal transmitted in an optical supervisory channel OSC, a second monitoring unit 18 adapted to monitor an optical data signal transmitted on an optical data channel and a third monitoring unit 20 adapted to monitor an optical pump signal generated by the pump source unit 7. Each monitoring unit is connected to an optical sputter adapted to tap the respective monitored optical signal. Each monitoring unit 8, 18, 20 comprises photodetectors PD adapted to convert the respective tapped optical signal into an electrical current I and transimpedance amplifiers TIA which are provided to transform the converted electrical current I into a feed-forward control voltage $V_s$ indicating a signal power of the respective monitored optical signal.

The pump source unit 7 comprises driver amplifiers DAs, for laser diodes LDs. The laser diodes LDs are connected via polarization beam combiners PBCs to a pump WDM multiplexer 21 supplying the pump signal via the optical splitter 19 to the signal pump WDM multiplexer 14 of the pumped Raman amplifier 1 as shown in FIG. 1A.

The gain control unit 4 receives control voltage signals from the first, second and third monitoring units 8, 18, and 20. As can be seen in FIG. 1A the gain control unit 4 comprises a PID control circuit 5 which compares a control voltage $V_{RBS}$ indicating a ratio between the signal power of the monitored optical feedback signal and the signal power of the monitored optical feed-forward signal with a set voltage $V_{set}$ read from the look-up table 6 connected to an input 22a of the pumped Raman amplifier 1. The look up table 6 can be connected to a user interface UI where a user can set a desired Raman gain to generate a feedback (FB) control signal which controls the pump source unit 7 of said pumped Raman amplifier 1. As can be seen in FIG. 1A the gain control unit 4 further receives a feed-forward (FF) control signal provided by a monitoring unit of the pumped Raman amplifier 1. The feed-forward (FF) control signal is supplied to a first switching unit 23 of the gain control unit 4. The feedback FB control signal provided by the PID control circuit 5 of the gain control unit 4 is supplied to a second switching unit 24 of the gain control unit 4. The second switching unit 24 has two inputs, wherein the first input is connected to the output of the PID control circuit 5 and the second input is connected to a reference unit 25 providing a reference voltage $V_0$.

An integrated mode control circuit 26 controls the first and second switching unit 23, 24 of the gain control unit 4 to switch between different operation modes of the gain control unit 4. In a possible operation mode the pump power of the pump signal is controlled in response to the monitored optical feedback signal reflected back from the transmission line fiber 3 connected to the Raman amplifier 1. In a further possible operation mode the pump power of the optical pump signal is controlled in response to the monitored optical feedback signal and in response to the monitored optical feed-forward signal launched into said transmission line fiber 3.

In a possible embodiment the gain control unit 4 comprises feedback gain adjustment means 27 to adjust the feedback FB control signal output by the switching unit 24 and feed-forward gain adjustment means 28 to adjust a feed-forward FF control signal output by the second switching unit 23. The feedback gain applied by the feedback gain adjustment means 27 and the feed forward gain applied by the feed forward gain adjustment means 28 are read from the look-up table (LUT) 6 via terminals 22b, 22c respectively. The gain control unit 4 further comprises at least one signal adder 29 adapted to add the adjusted feedback control signal and the adjusted feed-forward control signal to generate a signal supplied to a driver amplifier DA of the pump source unit 7 as shown in FIG. 1A. The driver amplifier DA of the pump source unit 7 is adapted to amplify the signal and to supply the amplified signal to a laser diode LD of the pump source unit 7.

Figure 2:
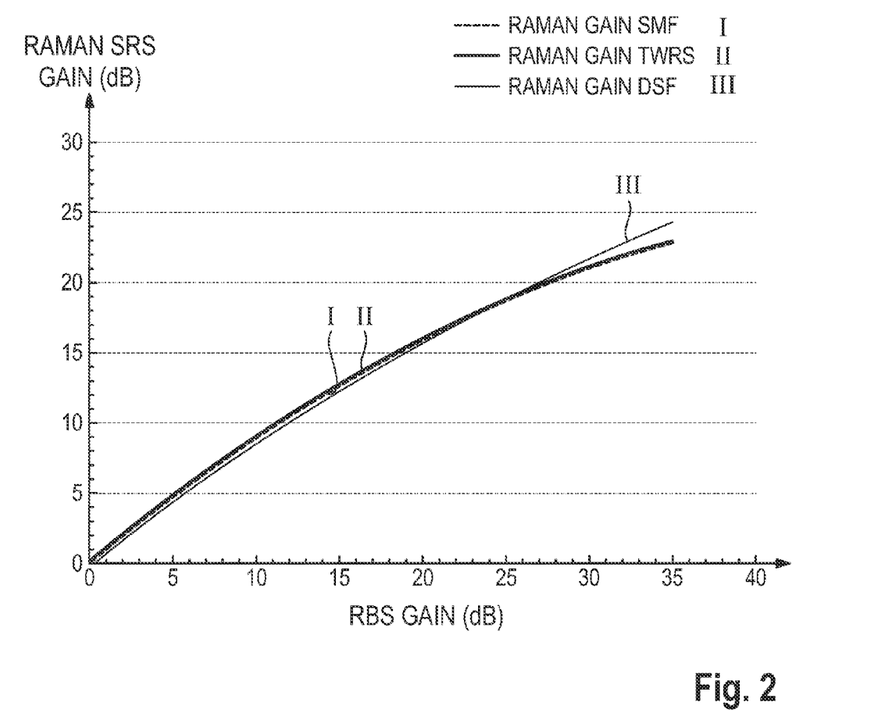
FIG. 2 shows a plot of change in back reflected optical power under different Raman gain set-points of a pumped Raman amplifier according to the present invention.

With the method according to the present invention it is possible to dynamically control the signal gain and saturation of the forward co-pumped Raman amplifier 1 shown in FIG. 1A. The Raman control employing the method according to the present invention can employ both, the signal light launched into the transmission line fiber 3 and the amplified signal Rayleigh backscattered (RBS) light reflected back from the transmission line fiber 3. The signal light launched into the transmission line fiber 3 is used for a feed-forward pump control. The signal light back-reflected (RBS) from the transmission line fiber 3 is used as a virtual feedback pump control signal. The transmitted forward signal light is data signal channels, pump signal channels and supervisory signal channel. The signal RBS light is composed of back-reflected data signal, pump signal and supervisory signal. The signal RBS light such as the data signal and supervisory signal is amplified by the Raman gain as the pump power is increased while the pump signal is depleted. The signal RBS gain is proportional to the signal SRS gain (i.e., Raman gain) as illustrated in FIG. 2. This makes it possible to employ the virtual feedback control employed by the method according to the present invention. The signal stimulated Brillouin scattered (SBS) light is avoided by controlling per channel data and supervisory signal launch power into the transmission fiber 3. The pump signal SBS is non-existent since the spectral linewidths of the pump LDs are very broad. The RBS gain versus Raman gain relationship shown in FIG. 2 is valid when ASE, data, supervisory or pump signal back reflection is monitored for closed loop gain control. However, when pump back reflection monitoring is used for closed loop gain control, the change in RBS takes a negative sign (i.e., RBS loss versus Raman gain). This is because when pump powers are increased to attain higher Raman gain pump depletion increases proportionally.

The pumped Raman amplifier 1 according to the present invention as shown in FIG. 1A comprises a feedback control loop, wherein the signal gain level can be adjusted to be constant over loss changes. The pumped Raman amplifier 1 can use the relationship between the Raman amplified back reflected signal RBS light and the Raman amplified transmitted signal light for different fiber types as illustrated in FIG. 2. The RBS coefficient varies from −29 to −31 dB for different fiber types. The RBS gain in FIG. 2 is defined as the RBS coefficient normalized to when pump powers are off (no Raman gain). When the loop is closed and the user sets the gain the control loop maintains the back reflection indicated in FIG. 2.

The pumped Raman amplifier 1 can monitor the optical pilot signal transmitted in the optical supervisory channel OSC and/or optical data signals transmitted on optical signal channels. In a possible implementation the gain control unit 4 receives monitoring signals from all monitoring units 8, 18, and 20. In an alternative embodiment the input of the gain control unit 4 is switchable between outputs of different monitoring units.

The pumped Raman amplifier 1 according to the present invention further comprises a feed-forward control loop to control gain saturation over input power changes. It is possible to use the pump power versus signal power relationship for different gain settings and for different fiber types of the transmission line fiber 3. In a possible embodiment a user can enter first a fiber type of the transmission line fiber 3.

As shown in FIG. 1B the counter-pumped Raman amplifier 1' is symmetrical structured to the co-pumped Raman amplifier 1 shown in FIG. 1A. The counter-pumped Raman amplifier 1' receives at terminal 2' an optical data signal, an optical supervisory OSC signal, backward ASE noise and backscattered pump signal $S_{RX}'$. At terminal 2', pump signal $S_{TX}'$ is transmitted into the transmission line fiber 3.

The pump signal is counter propagating with respect to the received data signal and supervisory signal. The data signal and supervisory signal $S_{IN}'$ are transmitted into the transmission fiber 3 from a far-end upstream node location.

The saturation point depends on the gain setting. The saturated large signal gain expression is given by:

$$G = \frac{G_0}{1 + \frac{\lambda_S}{\lambda_P}\frac{P_S}{P_P}G_0}$$

wherein $G_0$ is the unsaturated (small signal) gain,
$P_S$ is the signal power at the fiber input of the transmission line fiber 3,
$P_P$ is the pump power at the fiber input of the transmission line fiber 3,
$\lambda_S$ and $\lambda_P$ are the signal and pump wavelength, respectively.

The saturation signal power is:

$$P_{sat} = \frac{\lambda_p}{\lambda_s}\frac{P_P}{G_0}$$

A low input signal power ($P_S \ll P_{sat}$) the Raman gain is almost constant. However, the Raman gain does decrease as the input signal power $P_S$ increases, for example, due to adding or dropping channels.

The unsaturated gain $G_0$ is a function of the fiber parameters of the transmission line fiber 3 and the pump power $P_P$. The unsaturated gain can be expressed as follows:

$$G_0 = \exp\{C_R P_p L_{\mathit{eff}}\}$$

where $C_R$ is the Raman gain efficiency and $L_{\mathit{eff}}$ is the effective fiber length.

The expression of the pump power $P_P$ that is required to control gain saturation, i.e. to extend the input signal power range with a constant and spectrally flat gain, in the feed-forward control mode of the Raman amplifier 1, can be derived as follows:

$$P_P = P_0 + \frac{P_0}{\ln(G_0)}\ln\!\left(1 + \frac{P_S}{P_{sat}}\right)$$

This expression can be simplified further as:

$$P_P \cong P_0 + k \cdot P_S$$

where:

$$k = \frac{\lambda_S}{\lambda_P}\frac{G_0}{\ln(G_0)}$$

and $P_0$ is the required pump power to attain the small-signal gain $G_0$. At various gain settings the FF and FB gain coefficients are adjusted with the switching unit 24 switched to the reference voltage unit 25. The FB loop is engaged when the switching unit 24 is switched to the PID output. The expression including feedback (FB) control can be further simplified as:

$$P_P \cong k \cdot P_S + \Delta P$$

Where $\Delta P$ is part of the pump power produced by the FB control signal With the method according to the present invention FB control signal detected by the backscattered supervisory signal channel, signal data channel or signal pump channel power from the transmission line fiber 3 a virtual feedback loop can be established. By detecting the input data signal power a feed-forward loop is established. In using both loops, the speed of the transient response compensation can be significantly increased. The total transmitted pump power is related to the control voltage as follows:

$$P_P = \sum_{k=1}^{N_p} g_k \cdot (a_k \cdot V_S + b_k \cdot \Delta V)$$

Where $V_s$ is the FF control voltage, $\Delta V = V_{set} - V_{BR}$ (or $=V_{set} - V_{BRS}$) is the FB control voltage, $g_k$ is the conversion factor resulting from the product of the slope efficiency of the $k^{th}$ pump LD and the transconductance gain of the $k^{th}$ DA, $N_p$ is the total number of pump signal channels, $a_k$ is the $k^{th}$ pump signal FF gain adjustment factor and $b_k$ is the $k^{th}$ pump signal FB gain adjustment factor. Each pump channel is driven by a different control voltage level. The FF and FB gain adjustment factors are stored in the LUT 6 for various gain settings. FF and FB gain adjustment factors are chosen to produce a flat Raman gain spectrum at various gain settings and when signal is transmitted over various fiber types.

With the method according to the present invention it is possible to reduce transient and steady state gain errors when distributed forward Raman amplifiers are operating in a near saturated region. In an open loop the gain of the forward Raman can roll-off beyond a certain input power range. When the loop is closed the input power range can be extended keeping the gain constant as input signal power increases.

A further advantage of the method according to the present invention is to reduce transients very rapidly. Traffic patterns in a WDM optical communication system can change drastically when wavelengths 7, i.e. channels, are added or removed at the network end terminals or when wavelengths 7 are switched between deployed network fibers or when an optical fiber is cut. Optical amplifiers deployed in conventional networks may therefore experience a large optical power variation due to sudden changes of channel loading within the network fiber link. Surviving channels will experience large transients, i.e. power surges, if an optical amplifier is not rapidly gain controlled over a given input power dynamic range. Such transients can propagate and accumulate when passing through amplifier cascades within the optical network. When the surviving channels are received at the end terminals the rapid power variations can generate error bursts which will degrade the signal quality. With the method and apparatus according to the present invention it is possible to reduce these kinds of transients very rapidly. The method performs a fast dynamic gain control of the forward pumped distributed Raman amplifier 1 when sudden and large signal power variations occur at the input of the transmission line fiber 3.

There are three configurations when using pumped Raman amplifiers connected to the transmission line fiber 3.

In a first co-pumped Raman configuration only a co-pumped Raman amplifier 1 is connected to the transmission line fiber 3 as shown in FIG. 1A. The other end of the fiber is where the downstream node is located. The downstream node may be a line-amplifier node with an EDFA, or a ROADM node (not shown in FIG. 1A).

In a second counter-pumped Raman configuration a line-amplifier node with an EDFA or ROADM node at the upstream node location is connected to the transmission line fiber 3. A counter-pumped Raman 1' is connected to the other end of the transmission line fiber 3 as shown in FIG. 1B.

In a third bi-directional pumped Raman configuration both a co-pumped and counter-pumped Raman amplifier 1, 1' are connected to each end of the transmission line fiber 3. When using this configuration pump signals may crosstalk to each other causing the gain control to not work optimally. To overcome this one can use different pump channel wavelengths at co- and counter units and use an optical filter inside the pump unit before the back reflection is detected to avoid the leakage.

The invention claimed is:

1. A method for dynamically controlling signal gain and saturation of a pumped Raman amplifier, the method comprising:
    controlling a pump power of a pump signal of the pumped Raman amplifier in response to a plurality of monitored optical signals,
    wherein said plurality of monitored optical signals comprises:
        a signal light launched into a transmission line fiber connected to said pumped Raman amplifier, wherein said signal light launched into the transmission line fiber is used for a feed-forward pump control in order to control the signal gain; and
        an amplified signal Rayleigh backscattered (RBS) light reflected back from the transmission line fiber, wherein said amplified signal Rayleigh backscattered (RBS) light comprises a pump signal and is used for a feedback pump control in order to control the gain saturation.

2. The method of claim 1, wherein the signal light launched into the transmission line fiber is one of a data signal, a pump signal and a supervisory signal.

3. The method of claim 1, wherein the amplified signal Rayleigh backscattered (RBS) light further comprises at least one of a back-reflected data signal and a supervisory signal.

4. The method of claim 3, wherein said back-reflected data signal, and said supervisory signal are amplified by a Raman gain as said pump power is increased, while the pump signal is depleted.

5. The method of claim 4, wherein a gain of said amplified signal Rayleigh backscattered (RBS) light is proportional to the Raman gain.

6. The method of claim 1, further comprising controlling a per channel data and a supervisory signal launch power into the transmission fiber.

7. The method of claim 1, further comprising using pump back reflection monitoring for closed loop gain control.

8. The method of claim 7, wherein the amplified signal Rayleigh backscattered (RBS) light suffers a loss when compared to the Raman gain.

9. A pumped Raman amplifier comprising: a gain control unit adapted to control a pump power of an optical pump signal in response to a plurality of monitored optical signals,
    wherein said plurality of monitored optical signals comprises:
        a signal light launched into a transmission line fiber connected to said pumped Raman amplifier, wherein said signal light launched into the transmission line fiber is used for a feed-forward pump control in order to control the signal gain; and
        an amplified signal Rayleigh backscattered (RBS) light reflected back from the transmission line fiber, wherein said amplified signal Rayleigh backscattered (RBS) light comprises a pump signal and is used for a feedback pump control in order to control the gain saturation.

10. A gain control unit for a pumped Raman amplifier, wherein said gain control unit is adapted to control a pump power of an optical pump signal in response to a plurality of monitored optical signals,
    wherein said plurality of monitored optical signals comprises:
        a signal light launched into a transmission line fiber connected to said pumped Raman amplifier, wherein said signal light launched into the transmission line fiber is used for a feed-forward pump control in order to control the signal gain; and an amplified signal Rayleigh backscattered (RBS) light reflected back from the transmission line fiber, wherein said amplified signal Rayleigh backscattered (RBS) light comprises a pump signal and is used for a feedback pump control in orer to control the gain saturation.

* * * * *